United States Patent [19]

Melsheimer

[11] 3,774,876
[45] Nov. 27, 1973

[54] PIPE PINCHING MACHINE

[76] Inventor: Ted R. Melsheimer, 13668 E. Park St., Whittier, Calif. 90601

[22] Filed: Feb. 18, 1972

[21] Appl. No.: 227,418

[52] U.S. Cl. ................................. 251/8, 24/135 N
[51] Int. Cl. ........................................... F16k 7/06
[58] Field of Search .................. 128/346; 269/268; 251/4-10; 24/135 N

[56] References Cited
UNITED STATES PATENTS
1,309,321  7/1919  Fairweather ........................... 251/7

Primary Examiner—Martin P. Schwadron
Assistant Examiner—Richard Gerard
Attorney—Edward D. O'Brian

[57] ABSTRACT

A machine or tool for pinching so-called "polymer" or "plastic" pipe so that the interior of such pipe is closed can be constructed using a pair of opposed, parallel jaws mounted so that they may be moved relative to one another in order to bring them towards a pipe located between them. Each of the jaws has side edges which are shaped as curved surfaces; such surfaces on each of the jaws are spaced from one another. As the machine is operated the curved surfaces of each of the jaws engage different regions along the length of a pipe positioned between them so that the curved surfaces on each of the jaws act as separate jaws engaging and deforming different portions of the pipe.

10 Claims, 5 Drawing Figures

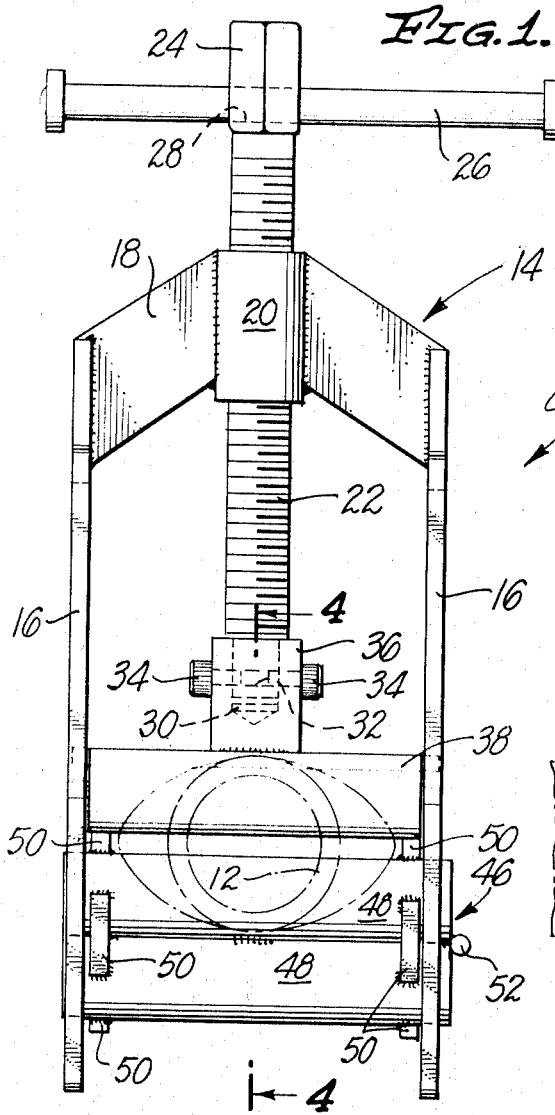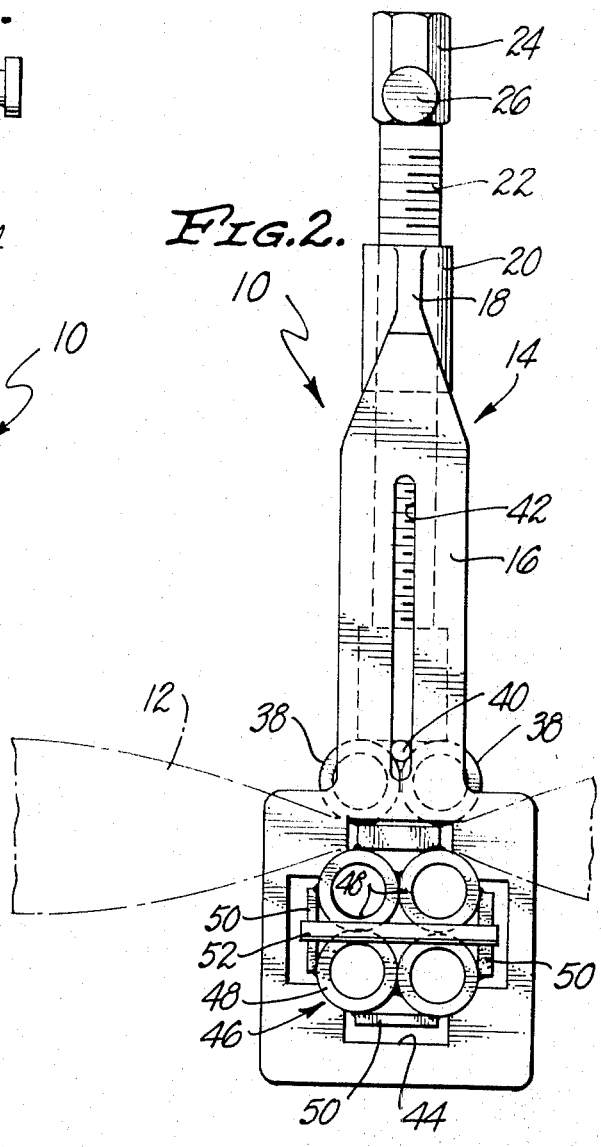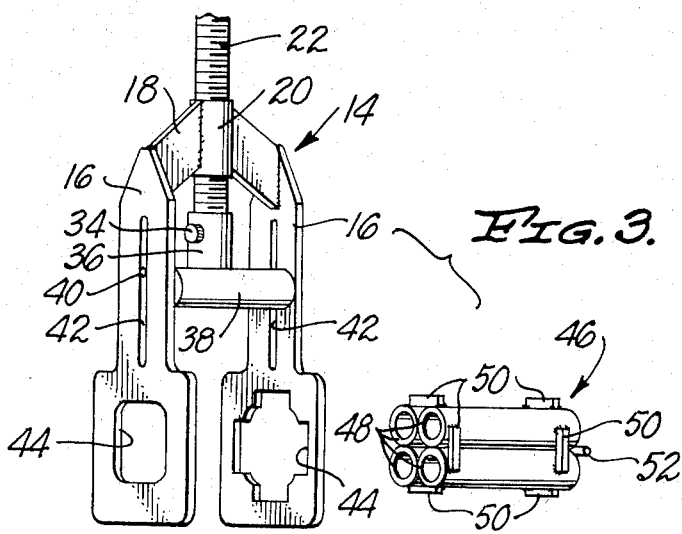

PIPE PINCHING MACHINE

BACKGROUND OF THE INVENTION

The invention set forth in this specification relates to a machine or tool for pinching off so-called "plastic" or "polymer" pipe and if desired certain types of non-ferrous pipe. This machine or tool has been developed in order to meet a need in the gas distribution and other industries for an implement which can be utilized in deforming such pipe so as to achieve a valve-type of action closing off the interior of a pipe so that a section of the pipe may be repaired and/or so that various connections may be made to such a section of pipe.

The need or necessity for a machine or tool of the type indicated in this specification can be best illustrated with reference to the gas distribution field. For economic and practical reasons it has been impossible to locate a large number of conventional valves in the pipes utilized to distribute gas so that various sections of such pipe may be closed or shut off in the event of line breakage or in the event that such sections are being connected to various fittings or the like.

For many years conventional steel pipe has been utilized for such gas distribution. It has been known to pinch off portions of such steel pipe by appropriate heating and clamping techniques. With the advent of plastic pipe, these techniques have not been acceptable because of the unique character of such pipe and the polymer compositions used within such pipe. Efforts to completely seal off or close off such pipes by clamping or pinching opposed sides of such pipes between opposed jaws have tended to either result in pipe breakage and/or the formation of small regions or areas at the ends of a pinched area in such pipe which are not closed.

SUMMARY OF THE INVENTION

A principal objective of the present invention is to provide a new tool or machine which can be utilized with common types of polymer or plastic pipes to pinch off such pipe so that a complete valve-like action is achieved without detrimentally effecting the structure of the pipe itself. In other words, it is an objective of the present invention to provide a device as indicated which can be used to pinch or close off a pipe of the type indicated without cracking or breaking the pipe structure.

Further objectives of the present invention are to provide a machine or tool as described which can be easily and conveniently constructed at a comparatively nominal cost; which can be easily utilized; which is capable of giving, prolonged, reliable performance; and which requires little or no maintenance. A still further objective of the present invention is to provide a machine or tool which can be conveniently installed in any desired location relative to a length of pipe. Another objective of the invention is to provide a machine or tool which may be satisfactorily utilized with pipes of various different dimensions.

In accordance with this invention these objectives as well as many advantages not specifically enumerated are achieved in a machine in which a pair of opposed parallel jaws are mounted on a mounting means or means for mounting so that they may be moved relative to one another so as to close off a pipe. In a machine or tool of this invention the side edges on each of the jaws is a curved surface and these surfaces are located far enough apart from one another so as to act as independent jaws in engaging and deforming a pipe by engaging different regions along the length of the pipe.

BRIEF DESCRIPTION OF THE DRAWINGS

A description of this type is inherently incapable of indicating many important facets and features of an invention. Further details of the invention will be apparent from a detailed consideration of the remainder of this specification and the accompanying drawings in which:

FIG. 1 is a front elevational view of a presently preferred embodiment of a machine or tool for pinching pipe in accordance with this invention;

FIG. 2 is a side-elevational view of this machine or tool showing the side of the machine or tool to the right in FIG. 1;

FIG. 3 is a partial exploded view illustrating certain parts employed in this machine or tool;

Figure 4:
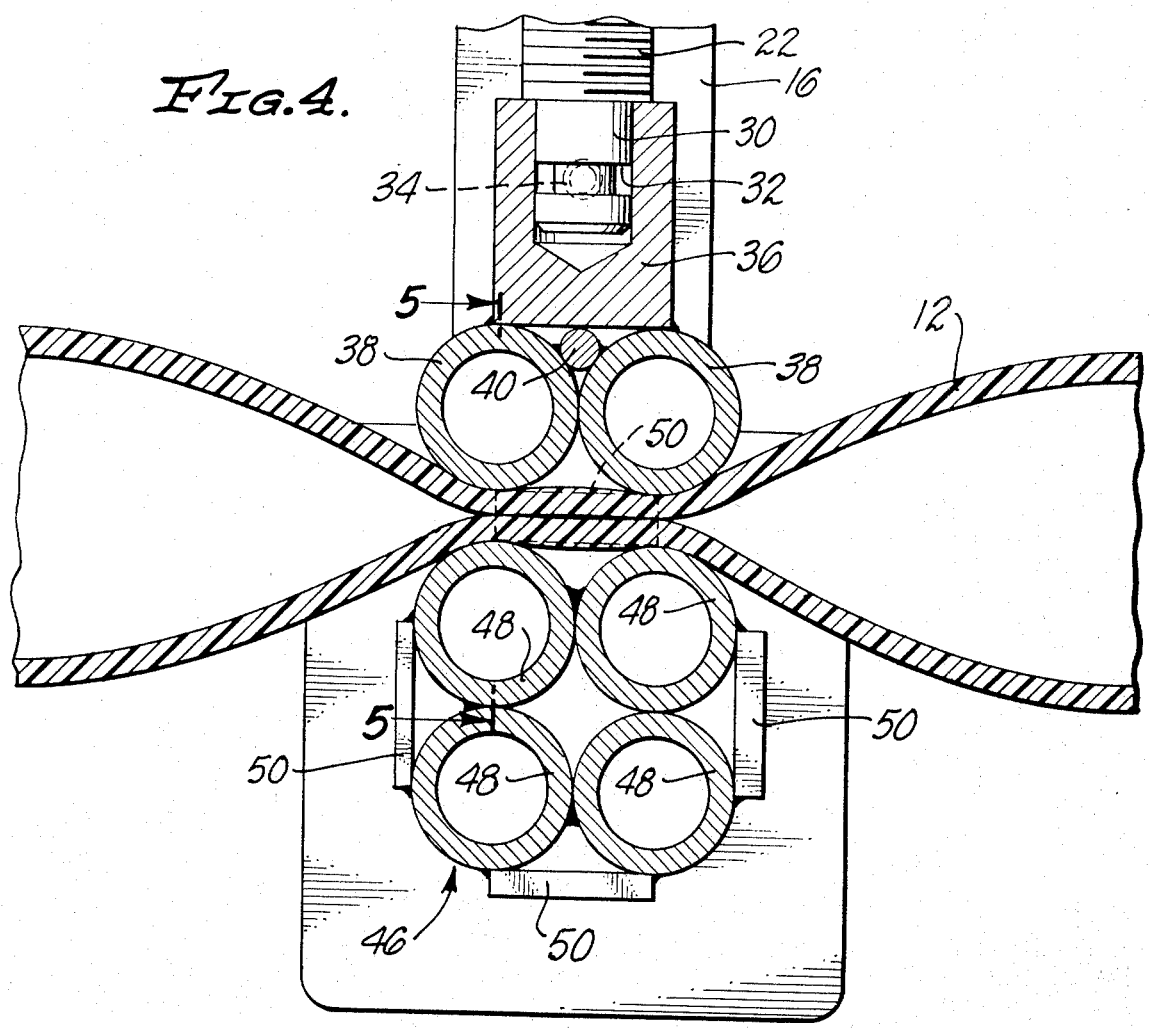
FIG. 4 is a partial cross-sectional view taken at line 4—4 of FIG. 1.

The particular machine or tool illustrated in the drawings is not the invention set forth in this specification in and of itself, but instead is a particular structure embodying the inventive concepts or features of this invention. Such concepts or features are defined by the appended claims forming a part of this specification. They may be embodied within other somewhat differently constructed and differently appearing machines or tools through the exercise of routine engineering skill.

DETAILED DESCRIPTION OF THE PREFERRED EMBODIMENT

In the drawings there is shown a machine or tool 10 for use in pinching a length of a pipe 12. It is to be made clear that the tool 10 is not intended for use with pipe formed from iron or steel or formed from various rigid polymer materials. This tool 10 is only intended for use with conventional plastic or polymer pipe such as is commonly utilized for gas transmission and other purposes.

The compositions of pipe used for such purposes are unimportant as far as an understanding of the present invention is concerned. The tool 10 is not intended for use with and is not considered to be useful with pipe of rigid or comparatively rigid or non-deformable plastic materials. This tool 10, although not intended for use with metal pipe can be employed satisfactorily with some types of non-ferrous pipes.

The tool 10 itself includes a yoke 14 having spaced opposed, parallel arms or legs 16 connected by a cross member 18 within the center portion of which there is located a threaded bushing 20. This bushing 20 holds a correspondingly threaded shaft 22. A nut-like head 24 is formed on one end of this shaft 22 so that it may be easily engaged or turned by conventional hand tools. Preferably a conventional handle 26 is slidably mounted in a hole 28 in this head 24 so that the shaft 22 may be conveniently turned.

A smooth, cylindrical end 30 is located on the end of the shaft 22 remote from the head 24. A common, conventional retaining groove 32 is provided in this end 30 so that a set screw 34 extending through the wall of a cup-like holder 36 may be used to secure this holder 36 to the end 30 in such a manner that the shaft 22 may rotate relative to the holder 36.

This holder 36 is secured to two tubular cylinders 38 and to a cross pin 40. This cross pin 40 fits within opposed, parallel slots 42 in the arms 16 so as to prevent rotation of the holder 36 during the operation of the machine or tool 10. These cylinders 38 are secured immediately adjacent to one another so as to extend parallel to one another in a common plane perpendicular to the axis of the shaft 22.

With the tool 10 there are opposed openings 44 in the arms 16 immediately below the slots 42. These openings 44 are designed so that they will be traversed by an assembly of jaws 46 consisting of four cylinders 48, each of which corresponds in dimension to each of the cylinders 38. These cylinders 48 are located next to one another in a "square" configuration so that they are all parallel to one another. Pairs of stop lugs or stops 50 of different dimensions are secured to two adjacent cylinders at each of the sides of the assembly 46 for a purpose as hereinafter indicated. A small cross member 52 useful in handling the assembly 46 may be secured to one of the ends of the assembly 46 as shown.

With the construction described the openings 44 are spaced so that the assembly 46 may be inserted within them with any two of the cylinders 48 located at the top of the assembly 46 with their axes in the same plane perpendicular to the axis of the shaft 22. These cylinders 48 at the top of the assembly 46 are spaced relative to the cylinders 38 in essentially a rectangular type of pattern in which each of the cylinders 38 is parallel to and spaced from each of the cylinders 48 and in which the corresponding two cylinders at the sides of the machine 10 are located in the same planes and in which such planes are parallel to one another.

During the use of the tool 10 the shaft 22 is turned so as to elevate the cylinders 38 within the yoke 14 and the assembly 46 is removed from this yoke 14. The yoke 14 is then located so as to straddle the pipe 12. After this is done the assembly 46 is reinserted in the yoke 14 so that a set of the stops 50 corresponding to the particular dimension and wall thickness of the pipe 12 are located at the top of this assembly 46. At this point the machine or tool 10 may be operated by turning the shaft 22 downwardly.

This, of course, will move the cylinders 38 downwardly so that they act as a first jaw consisting of two separate jaws moved in synchronism with one another as they come into engagement with the pipe 12. As such engagement occurs the pipe 12 will be forced against the two uppermost cylinders 48 so that these cylinders 48 act as a second jaw consisting of two separate jaws operating in synchronism with one another. At this motion occurs the two curved surfaces at each of the side edges of such composite jaw structures will gradually engage and deform the pipe 12.

This will have the effect of gradually deforming the pipe 12 as the machine 10 is further operated until such time as the cylinders 38 engage the exposed stops 50. These stops 50 are proportioned so that for the particular pipe 12 being worked on there will not be a reduction or pinching of the pipe 12 to the point where the pipe 12 is damaged. They are, however, sufficiently low or small so that the machine 10 can be operated to completely close off the pipe 12 as indicated in FIG. 5.

Figure 5:
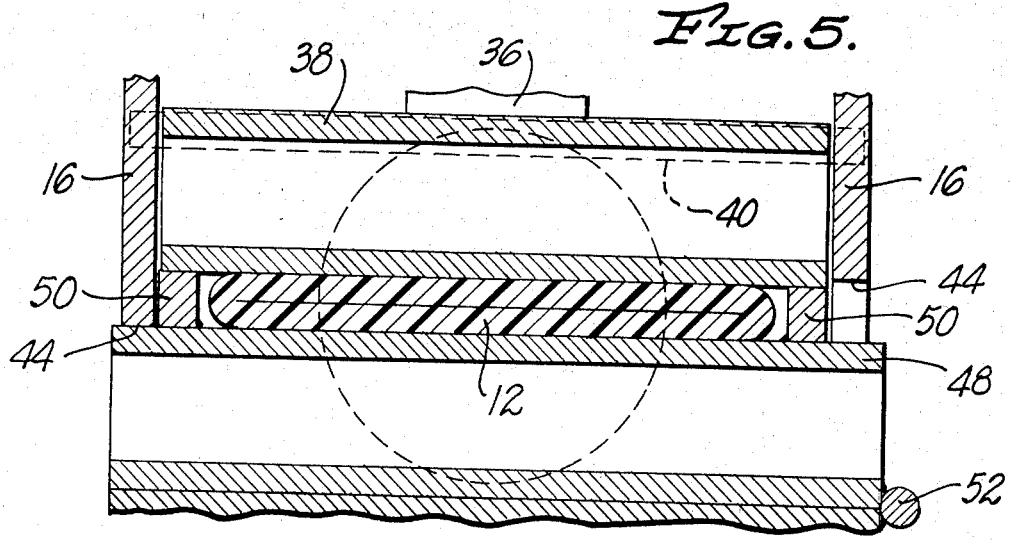
FIG. 5 is a partial cross-sectional view taken at line 5—5 of FIG. 4.

A surprising aspect of the invention lies in the fact that if a pipe such as the pipe 12 is pinched off between two conventional jaws the interior of the pipe 12 will not be closed off as indicated in FIG. 5, but that small pocket-like regions or areas will remain at the ends of the flatened interior of the pipe 12 which cannot be closed off without damaging the pipe 12. The reasons for this are unknown, but are presumed to relate to the internal stresses and strains created in a deformed wall of an initially cylindrical pipe.

By spacing the cylinders 38 and 48 employed at any one time so that there are separate, spaced, parallel curved surfaces of a uniform cross-sectional configuration engaging a pipe such as the pipe 12 this result is avoided, presumably because of pipe deformation created by the machine 10 causes gradual folding action between the surfaces of the cylinders 38 and 48 at opposite sides of the tool or machine 10.

In order to achieve the desired results the pairs of stops 50 should be proportioned as indicated so as to correspond to particular pipe sizes with which the machine or tool 10 is to be used. Further, there should be a relationship between the curvature of the cylinders involved and the diameter of the pipe used with the machine or tool 10. It is considered that preferred results are achieved when the ratio between the diameters of the cylinders 38 and 48 to the diameter of the pipe 12 pinched with the tool 10 is within the range of from about 1 to 2 to about 1 to 4. If the pipe pinched has a larger diameter than indicated it is considered that an undesirable amount of torque on the shaft 22 is required to close off the interior of the pipe 12. If the pipe diameter of the pipe 12 is smaller than indicated by this ratio it is considered that it may be relatively difficult to completely close off the interior of a pipe 12.

It is believed that it will be apparent to those skilled in the art to which this invention pertains how the machine or tool 10 meets the various objectives indicated in the preceding discussion. In this machine 10 the yoke 14 and the associated parts used with it such as the shaft 22 constitute a means for mounting the individual "double" jaws described so as to create relative movement between them so as to bring them towards one another. It is to be understood that different structures capable of being designed through routine engineering skill may be employed for this purpose.

I claim:

1. A machine for pinching polymer pipe so as to close off the interior of a pipe, said machine including a pair of opposed, parallel jaws each of which has side edges located so that a pipe is capable of being positioned between them, and means for mounting said jaws so as to create relative movement between them so as to bring them towards one another so that a pipe may be pinched off between them, in which the improvement comprises:

said side edges of each of said jaws being separate curved surfaces, said surfaces on each of said jaws being spaced from one another, said jaws being positioned so that they are parallel to one another with each curved surface on each jaw being spaced opposite and parallel to a curved surface on the other of said jaws, said jaws being located on said mounting means so that as said machine is used said curved surfaces on each of said jaws engage different regions along the length of a pipe positioned between them so that said curved surfaces on said jaws act as two separate jaws engaging and deforming independently different portions of such a pipe and applying means for causing relative motion between said jaws so as to move said jaws linearly in parallel planes towards one another so that said curved surfaces simultaneously engage a pipe positioned between said jaws.

2. A machine for pinching polymer pipe as claimed in claim 1 wherein:
said curved surfaces of said jaws all have a uniform cross-sectional configuration across the widths of said jaws.

3. A machine for pinching polymer pipe as claimed in claim 1 wherein:
all of said curved surfaces are identical cylindrical surfaces and all of said cylindrical surfaces have parallel axes, the surfaces on said jaws at adjacent, opposed side edges being equally spaced from one another.

4. A machine for pinching polymer pipe as claimed in claim 3 wherein:
the ratio between the diameters of said curved surfaces to the diameter of a pipe to be pinched in said machine is within the range of from about 1–2 to 1–4.

5. A machine for pinching polymer pipe as claimed in claim 1 wherein:
each of said jaws includes two identical cylinders located next to one another and parallel to one another, said cylinders at opposed side edges being equally spaced from one another.

6. A machine for pinching polymer pipe as claimed in claim 5 wherein:
the ratio between the diameters of said curved surfaces to the diameter of a pipe to be pinched in said machine is within the range of from about 1–2 to 1–4.

7. A machine for pinching polymer pipe as claimed in claim 1 wherein:
said mounting means includes a yoke adapted to be located around a pipe to be pinched with said machine,
a first one of said jaws being mounted on said applying means so as to be movable therewith,
the second one of said jaws being removably mounted on said yoke so as to extend across said yoke, enabling said yoke with said second one of said jaws removed to be placed around a pipe so that said second one of said jaws may be subsequently secured in position to render said machine operable.

8. A machine for pinching polymer pipe as claimed in claim 7 wherein:
the arms of said yoke include opposed openings formed therein and including,
said second one of said jaws being one of an assembly of jaws, each jaw of said assembly having a stop associated therewith to arrest the pinching movement of the machine, each stop being of different size to vary the pinching movement accordingly, and
said assembly being capable of being fitted within said openings in said yoke so as to selectively position one of said jaws of said assembly and associated stop opposite said first of said jaws during the operation of said machine.

9. A machine for pinching polymer pipe as claimed in claim 8 wherein:
each of the jaws specified includes two identical cylindrical surfaces, the curved surfaces on the jaws spaced opposite one another in said machine being identical.

10. A machine for pinching polymer pipe as claimed in claim 8 wherein:
each of said jaws includes two identical cylinders located next to one another and parallel to one another,
said first and said second jaws are of such dimension that the ratio of the diameters of said cylinders to the diameter of a pipe to be pinched in said machine is within the range of from about 1 to 2 to 1 to 4.

* * * * *